W. D. McCOY.
GINNING AND DELINTING MACHINE.
APPLICATION FILED SEPT. 12, 1914.
1,279,565.
Patented Sept. 24, 1918.
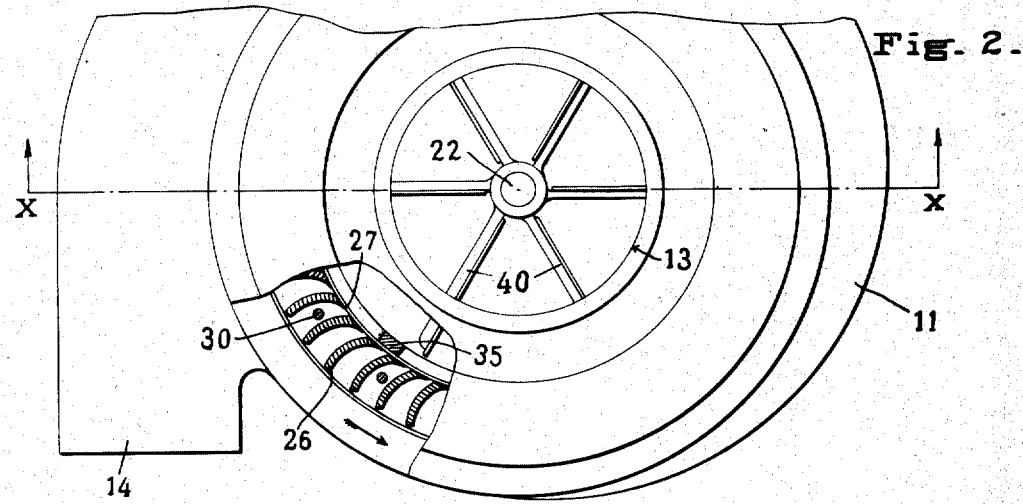
Fig. 2.
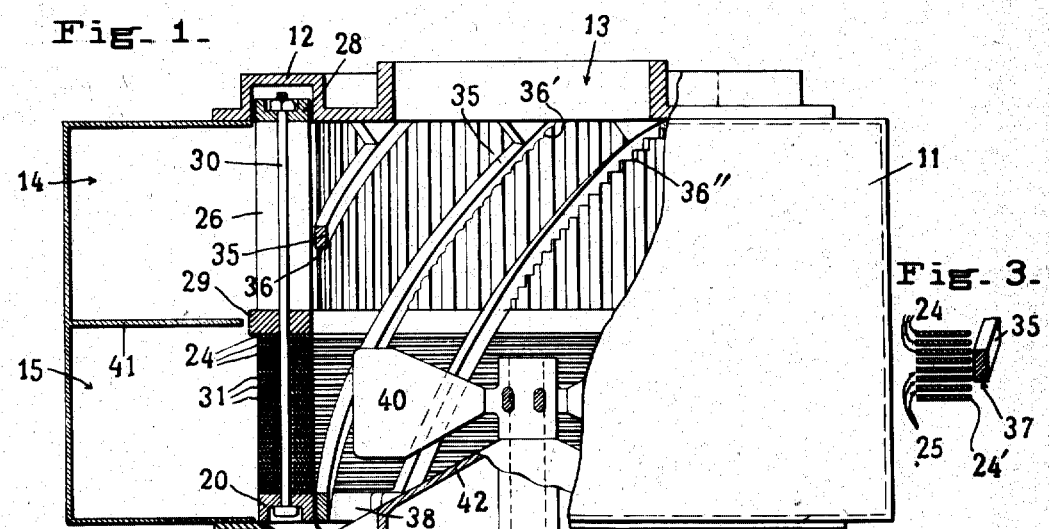
Fig. 1.
Fig. 3.
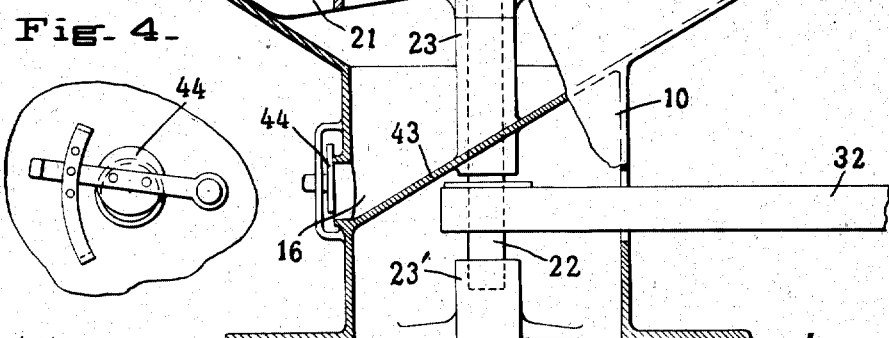
Fig. 4.
Attest:
J Clyde Ripley
E Bradford
Inventor:
William D. McCoy,
by
Atty

UNITED STATES PATENT OFFICE.

WILLIAM D. McCOY, OF BROOKLYN, NEW YORK.

GINNING AND DELINTING MACHINE.

1,279,565.  Specification of Letters Patent.  Patented Sept. 24, 1918.

Application filed September 12, 1914.  Serial No. 861,342.

*To all whom it may concern:*

Be it known that I, WILLIAM D MCCOY, a citizen of the United States of America, and residing at Brooklyn, in the county of Kings and State of New York, have invented new and useful Improvements in Ginning and Delinting Machines, of which the following is a specification.

My invention relates particularly to the treatment of seed cotton.

One object is to provide simple and compact mechanism for rapidly and completely separating long and short fiber from the seed. Another object is to provide in a single machine means for performing what are commonly termed the "ginning" and the "delinting" operations which are usually performed in separate machines.

In the form shown the invention contemplates a casing with a cylindrical member dividing it into an inner and an outer chamber. This cylindrical member is made up of a plurality of suction creating plates and blades with spaces between them permitting the passage of the fiber but too small to allow the seed to pass. A plurality of stripping members are arranged adjacent the inner wall of this cylindrical member and the seed fiber is drawn into the inside of the cylinder by suction or pressure. The fiber is thus forced or drawn out through the openings between the plates and blades. The cylindrical member is rotated relative to the strippers and at high speed so as to separate the seed from the fiber which is being sucked through the wall.

Preferably the upper part of the cylinder has its blades vertical and the strippers adjacent thereto are constructed and arranged to knock off the seed from the longer fiber. The lower part of the cylinder has its plates horizontal and the strippers adjacent thereto are provided with an abrasive surface of emery or like a file so as to remove what are commonly termed the "linters".

The outer chamber is preferably divided into two parts so as to keep the longer fiber and the linters separate.

The strippers are preferably arranged inclined and the cylinder is rotated so as to bring the seed against the under side of the strippers and thus allow the seed to move downward as soon as released.

The angular position of the stripping members relatively to the cylinder, forces the seed downward and diagonally across the faces of the blades and plates which comprises the ginning members. This facilitates the ginning action on the seed, turning the seed so that the entire area of the seed is acted on by the ginning and delinting members.

I also prefer to employ a fan in the cylinder for assisting in opening the seed fiber and throwing the seed and fiber outward against the inner wall of the cylinder and strippers and augmenting the outward current of air between the horizontal plates in the lower part of the cylinder.

By rotating the cylinder with respect to the stripper, the rotation of the cylinder draws the air outward through its wall so as to suck the fibers from the inner to the outer chamber.

Figure 1, is a side view and partial vertical section on the plane X—X of Fig. 2 of a machine embodying the improvements of my invention showing the ginning and delinting mechanism.

Fig. 2, is a fragmentary plan and partial horizontal sectional view of the same showing parts of the ginning mechanism.

Fig. 3, is a fragmentary vertical sectional view of part of the delinting mechanism.

Fig. 4, is a fragmentary detail vertical projection showing the door or gate for controlling the admission of air to the seed outlet.

The casing has a standard 10, an outer shell 11 and a top piece 12. The seed fiber comes in through the top opening 13 either by air pressure or suction. The ginned fiber passes out through the side flues 14 and 15, the long fiber coming from the upper flue 14 and the short fiber or "linters" from the lower flue 15. The seed passes out the exit 16 at the bottom.

The ginning cylinder has a bottom frame consisting of a ring 20 carried by arms 21 in the form of a spider. This frame is carried by the shaft 22 and supported by the journal 23 and the step bearing 23'. The lower half of the cylinder consists of a plurality of thin annular horizontal plates 24 with thin spaces 25 between adjacent plates for the fiber. The plates 24 may have their inner edges 24' finely serrated or toothed to increase the adhesive force on the fiber at the instant of ginning. The upper half consists of a plurality of spaced vertical blades 26 with the inner edge 27 of each forwardly projected and so close to the back of the next blade that seeds cannot pass through. The ring 28 forms the upper rim of the cylinder and the ring 29 forms the middle of the cylinder. The three rings 20, 28 and 29 are tied together by rods such as 30. Washers such as 31 may be used to space the adjacent plates 24 apart. The shaft 22 and the ginning cylinder are rotated in the direction of the arrow at high speed, by any suitable means, as a belt 32. This rapid rotation draws the air and fiber outward between the plates and blades with great force. The shape of the blades 26 is such as to create a particularly powerful outward suction when the cylinder and blades are rotated in the direction of the arrow shown in Fig. 2.

The strippers 35 are carried by the top plate 12 and are arranged at helical inclines just inside of the cylinder. The lower faces of the upper portion of these strippers may be smooth, serrated or provided with steps adjacent the blades 26 to remove the seed from the long fiber which is held between the blades 26. If the under faces of the strippers are smooth as at 36 an effective shearing action is obtained. By making the edge scalloped as at 36' there is less shearing effect. By having the edge stepped as at 36'' there is even less effective shearing and a more abrupt engagement with the seed and danger of breaking the seed by impact. An irregular edge however has the advantage of turning the seed over and thus facilitating the removal of the fiber. To get the combined advantage some strippers may be smooth, some serrated and some stepped so that the seed fiber is subjected successively to the influence of all three varieties of actions. The lower faces of the lower portions of these strippers are provided with emery or small teeth like file teeth at 37 for removing the lint. The lower ends of the strippers are connected by a ring 38.

A fan 40 may be provided on the shaft 22 for augmenting the circulation of air particularly between the plates 24 and serves to keep the seed fiber in motion. It also throws the seed fiber out against the strippers and against the inner wall of the ginning cylinder. A partition 41 divides the casing and flue into two parts on a level with the center ring 29 so that the longer fiber may pass out the flue 14 and the linters through the flue 15. The bottom of the cylinder is formed by the inclined floor 42. The rotary movement of this floor keeps the ginned seed in motion. The seed fall from the floor 42 onto the inclined floor 43 of the casing and thence out the exit 16. Air rushing in through this opening 16 draws back any unginned or only partially ginned seed fiber up into the cylinder where it has another chance to be ginned. The passage 16 may be controlled by a valve or door 44 for regulating the air outlet.

The operation is substantially as follows: The seed fiber is sucked through the opening 13 into the machine. The revolving cylinder generates an outward air current and the longer and lighter fibers are drawn out into the openings between the blades 26 and the seeds are knocked off from the fiber by the action of the strippers 35. The fiber then passes into the outer chamber and flue 14. The seeds having short fiber or linters fall or are forced down by the inclined strippers and are held against the plates 24 by the suction through passages 25 the action of the fan 40 and centrifugal force. The abrasive surfaces 37 and 24' on the strippers 35 and plates 24 take off the lint which is then drawn out through the openings 25 into the outer chamber and flue 15. The ginned seed fall or are gradually forced onto the bottom 42 of the cylinder and thence into the hopper-like construction below and thence down the incline 43 and out to the bins or suitable conveyer (not shown). The air drawn into the bottom lifts up any unginned seed or partially ginned seed back into the cylinder for further treatment. This insures the complete ginning and delinting of the entire mass of seed fiber in the single machine. The parts are so constructed that there is little to get out of order and but little wear.

The term "cylinder" as employed in the claims is intended to be construed broadly as a member rotatable about an axis even though the elements of its surface are not exactly parallel, as long as they extend generally in a longitudinal direction as for instance, in a cone or frustum of a cone. The term "vanes" may be applied to the vertically curved blades and also to the horizontal annular plates since both serve to force or draw the air outwardly from the inner chamber to the outer chamber.

It should be understood that I contemplate that many changes may be made in this construction without departing from the spirit or scope of my invention.

What I claim is:—

1. Apparatus of the character described, comprising a cylinder having suction-creating blades with lateral passages between them for fiber, stripping members inside said cylinder and means for rotating said cylinder about the stripping members so as to create suction to draw out the fiber and knock off the seed.

2. Apparatus of the character described, comprising a cylinder having suction-creating blades with lateral passages between them for fiber, stripping members inside said cylinder, means for rotating said cylinder about the stripping members so as to create suction to draw out the fiber and knock off the seed and a rotating fan for the purpose specified.

3. Apparatus of the character described, comprising a rotating cylinder having a plurality of spaced curved suction-creating blades with passages between them, and strippers arranged adjacent thereto.

4. Apparatus of the character described, comprising a rotating cylinder having a plurality of spaced curved suction-creating blades with passages between them and inclined strippers arranged adjacent thereto.

5. Apparatus of the character described, comprising a rotating cylinder having suction-creating blades with lateral passages therebetween and stationary inclined strippers arranged adjacent the innner wall of said cylinder.

6. Apparatus of the character described, comprising a rotating cylinder having a plurality of spaced curved suction-creating blades with passages between them, strippers arranged adjacent thereto and a fan rotatable inside of said strippers.

7. Apparatus of the character described, comprising a rotating cylinder having suction-creating blades with lateral passages therebetween, stationary inclined strippers arranged adjacent the inner wall of said cylinder, a rotary fan inside said strippers, an outlet for seed at the bottom and means for admitting air adjacent said seed outlet.

8. Apparatus of the character described, comprising a single cylinder having lateral suction-creating blades and plates and means for coöperating therewith for separating the long fiber and also for delinting the seed.

9. Apparatus of the character described, comprising a single rotating cylinder having lateral suction-creating blades and plates and strippers for separating the long fiber and strippers for delinting.

10. Apparatus of the character described, comprising a rotating cylinder having vertical blades and horizontal plates forming a suction-creating wall and strippers coöperating with said wall of said cylinder.

11. Apparatus of the character described, comprising a rotating cylinder having vertical blades and horizontal plates forming a suction-creating wall and inclined strippers coöperating with said wall of said cylinder.

12. Apparatus of the character described, comprising a rotating cylinder having suction-creating blades with lateral passages between them for the fiber, stationary strippers inside said cylinder and a fan rotating inside of said strippers.

13. Apparatus of the character described, comprising a rotating cylinder having suction-creating blades with lateral passages between them for the fiber, stationary inclined strippers inside said cylinder and a fan rotating inside of said strippers.

14. Apparatus of the character described, comprising a rotating cylinder, strippers arranged inside thereof, some of said strippers having smooth faces and others having serrated faces and means for creating a flow of air from one side of the cylinder to the other side thereof.

15. Apparatus of the character described, comprising a rotating cylinder, inclined strippers arranged inside thereof, some of said strippers having smooth faces and others having serrated faces, and means for creating a flow of air from one side of the cylinder to the other side thereof.

16. Apparatus of the character described, comprising a rotating cylinder, strippers arranged inside thereof, some of said strippers having smooth faces and others having serrated faces, and a rotary fan inside said strippers.

17. Apparatus of the character described, comprising a rotating cylinder having a rotary bottom, strippers within said cylinder, means for admitting air at the bottom for lifting unginned and partially ginned seed and fiber and a rotary fan inside said cylinder for the purpose specified.

18. Apparatus of the character described, comprising a rotary cylinder, a support therefor at the bottom thereof, strippers inside said cylinder, a casing surrounding said cylinder, said strippers being suspended from the upper part of said casing and a rotary fan inside said cylinder.

19. Apparatus of the character described, comprising a plurality of thin annular plates having thin spaces between them, stationary strippers arranged inside of said plates and means for rotating said plates and creating an outward flow of air through said spaces.

20. Apparatus of the character described, comprising a plurality of thin annular plates having thin spaces between them, stationary strippers arranged inside of said plates, means for rotating said plates and creating an outward flow of air through said spaces and a fan rotating inside of said strippers.

21. Apparatus of the character described, comprising a plurality of thin annular plates having thin spaces between them, stationary inclined strippers arranged inside of said plates and means for rotating said plates and creating an outward flow of air through said spaces.

22. Apparatus of the character described, comprising a rotating cylinder having a plurality of blades with passages between them for the lint fiber and thin plates with passages between them for the linters, and strippers extending along the inner surface of said blades and said plates and having their edges adjacent thereto provided with surfaces adapted to coöperate therewith in the ginning and delinting operations respectively.

23. Apparatus of the character described, comprising a cylinder having blades with passages between them for the fiber and thin plates with passages between them for the linters, strippers extending along the inner surface of said blades and said plates and having their edges adjacent thereto provided with surfaces adapted to coöperate therewith in the ginning and delinting operations respectively and means for producing a relative rotary movement between said cylinder and said strippers.

24. Apparatus of the character described, comprising a casing having one chamber for receiving the seed fiber, a second chamber for receiving the lint fiber, a third chamber for receiving the linters, and a fourth chamber for receiving the ginned and delinted seed and means for separating the seed from the lint and from the linters and distributing the lint, the linters and the seed into their respective chambers.

25. Apparatus of the character described, comprising a casing having one chamber for receiving the seed fiber, a second chamber for receiving the lint fiber, a third chamber for receiving the linters and a fourth chamber for receiving the ginned and delinted seed and means comprising a cylinder and a stripper, one of which rotates relative to the other for separating the seed from the lint and from the linters and distributing the lint, the linters and the seed into their respective chambers.

26. Apparatus of the character described, comprising a casing having one chamber for receiving the seed fiber, a second chamber for receiving the lint fiber, a third chamber for receiving the linters and a fourth chamber for receiving the ginned and delinted seed and means comprising a rotating cylinder and relatively stationary strippers for separating the seed from the lint and from the linters and distributing the lint, the linters and the seed into their respective chambers.

27. In a cotton gin, the combination with a revoluble member having multiple suction-creating vanes and comprising a ginning device and a fixed member adjacent the revoluble member, comprising a stripping device, of a casing inclosing said members comprising a flue.

28. In a cotton gin, a revoluble member comprising, a curved wall formed by multiple suction-creating blades, a stripping member adjacent the wall and means for revolving said wall.

29. Ginning apparatus comprising, a member having a curved wall formed by a succession of suction-creating plates and separating two chambers, a stripping member adjacent the wall of the inner chamber and means of rotating one of the said members relatively to the other.

30. Ginning apparatus including a stripping device adjacent a revoluble ginning member, the latter having suction-creating blades comprising a wall with apertures between the blades, whereby when the ginning member is revolved, a current of air is induced outwardly of the wall between the blades.

31. In a cotton gin, a ginning chamber having a curved wall comprising multiple blades and a wall comprising multiple annular plates with apertures through the wall between the blades and between the plates and a stripping device adapted to coöperate with the walls in a ginning operation.

32. In a cotton gin, the combination with two relatively movable members, comprising stripping and ginning devices, one of the members, comprising a wall formed by suction-creating plates spaced to leave apertures between the plates through the wall, and a casing comprising a flue inclosing said members.

33. In a cotton gin, the combination with two relatively revoluble members, one within the other, and forming a chamber and comprising stripping and ginning devices with walls defining suction-creating blades with spaces between providing apertures through the wall of the ginning device, a casing comprising a flue inclosing said members and means for creating a draft of air through the apertures, outwardly of said chamber into said flue.

34. Ginning apparatus, comprising a ginning wall and adjacent strippers constituting one element, and a delinting wall and adjacent strippers constituting another element, both of said elements coöperating, one element accomplishing a ginning action to produce lint cotton and the other element accomplishing delinting action to produce linters and means for separating the product of the one element from that of the other.

35. The combination in a single machine of means for separating seed from relatively long fiber, means for separating linters from the seed, means for successively presenting the raw material to said two separating means respectively, means for conveying the long fiber and the linters away separately and means for conveying away the seed.

36. Ginning apparatus comprising a relatively rotatable ginning cylinder and strippers, said ginning cylinder having a ginning wall located in close proximity to the strippers and comprising suction creating members closely spaced to accomplish a ginning function in addition to the suction creating function.

WILLIAM D. McCOY.

Witnesses:
R. S. ALLYN,
E. BRADFORD.